United States Patent [19]
Matsumoto et al.

[11] 4,220,528
[45] Sep. 2, 1980

[54] PROCESS FOR DISOXIDATING GAS OR WATER

[75] Inventors: Masao Matsumoto; Isao Manabe, both of Tokushima, Japan

[73] Assignee: Otsuka Chemical Co., Ltd., Osaka, Japan

[21] Appl. No.: 946,737

[22] Filed: Sep. 29, 1978

[30] Foreign Application Priority Data

Oct. 5, 1977 [JP] Japan .............................. 52/120280
Mar. 14, 1978 [JP] Japan ................................ 53/29568

[51] Int. Cl.$^2$ ............................................. C02B 1/10
[52] U.S. Cl. ................................ 210/758; 55/53; 252/188; 252/390; 252/401; 422/16; 423/219
[58] Field of Search ............ 55/53; 210/48, 54, 57–59, 210/62; 252/389 R, 390, 394, 396, 400 R, 401, 405, 407, 178, 181, 188; 260/396 R; 422/14, 16; 423/219, 407

[56] References Cited

U.S. PATENT DOCUMENTS

| | | | |
|---|---|---|---|
| 2,127,450 | 8/1938 | Schneider et al. | 210/48 |
| 3,213,114 | 10/1965 | Braxton et al. | 260/396 R |
| 3,235,324 | 2/1966 | Merriman | 210/58 |
| 3,375,200 | 3/1968 | Robertson | 252/181 |
| 3,551,349 | 12/1970 | Kallfass | 422/16 |
| 3,843,547 | 10/1974 | Kaufman | 252/392 |
| 3,962,113 | 6/1976 | Schiessl et al. | 423/219 |
| 4,096,090 | 6/1978 | Noack | 422/16 |

FOREIGN PATENT DOCUMENTS

52-50972 4/1977 Japan .

*Primary Examiner*—Benoit Castel
*Assistant Examiner*—Peter A. Hruskoci
*Attorney, Agent, or Firm*—Armstrong, Nikaido, Marmelstein & Kubovcik

[57] ABSTRACT

A process for disoxidating a gas which comprises contacting a gas being inert to hydrazines with a solution containing (A) at least one of hydrazines and (B) at least one of (i) quinones having a first half-wave potential of not more than −650 mV against a saturated calomel electrode at 25° C. in acetonitrile in the case of employing 0.1 N tetraethylammonium perchlorate as an indicating electrolyte, and (ii) hydroquinones being the reduced forms of the foregoing quinones, and if desired, (C) an alkali agent. According to the process, the oxygen in a gas is removed in a high efficiency at a low cost without disadvantages such as the accumulation of nonvolatile materials and the limitation in the capacity of absorbing oxygen. A process for disoxidating water which comprises the steps of (I) disoxidating a gas being inert to hydrazines and water by contacting the gas with a solution containing (A) at least one of hydrazines, (B) at least one of the above-mentioned quinones and hydroquinones, and (C) an alkali agent, (II) contacting the disoxidated gas as it is or after purified with a water containing a dissolved oxygen to remove the large portion of the oxygen from the water, and (III) removing a slight amount of the oxygen remaining in the treated water by adding a nonvolatile disoxidant in an amount corresponding to that of the residual oxygen. According to the process, the dissolved oxygen in water is removed in a high efficiency at a low cost without the formation of toxic or corrosive volatile materials and the accumulation of nonvolatile materials.

19 Claims, 2 Drawing Figures

PROCESS FOR DISOXIDATING GAS OR WATER

BACKGROUND OF THE INVENTION

The present invention relates to a novel process for disoxidating gases and a novel process for disoxidating water, particularly boiler feed water. More particularly, the present invention relates to a process for removing oxygen from a gas by employing hydrazines and a process for removing oxygen from water by employing the disoxidated gas.

Various kinds of gases including nitrogen are employed for many industrial uses. The oxygen being present in gases tends to cause combustion or corrosion. There are many uses in which it is desirable to employ gases free from oxygen.

As the process for disoxidating gases, there are known a process for removing the oxygen in air by combustion which is suitable for removing a large amount of oxygen, and a disoxidation process employing a reduced copper or an alkaline solution of pyrogallol which is suitable for removing a small amount of oxygen. In the combustion process, however, a considerable amount of oxygen is liable to remain. The disoxidation process employing the reduced copper is limited to specified uses such as the disoxidation of highly purified gases because of the high cost. The disoxidation process employing the alkaline solution of pyrogallol is unsuitable as a continuous disoxidation process because of the accumulation of nonvolatile materials resulting from the reaction of oxygen and pyrogallol, and the limitation in the capacity of absorbing oxygen, and the practice of the process also requires a high cost.

On the other hand, generally water being in contact with air contains 7 to 15 ppm of a dissolved oxygen. When such a water is employed, for instance, as a boiler feed water, it causes corrosion which results in various troubles. In such a case, it is requested to remove the dissolved oxygen.

The conventional processes for removing the dissolved oxygen in water are classified into the following two groups from the point whether a disoxidant added to water is completely evaporated or not.

One is a process employing hydrazine as a disoxidant which is mainly applied to water employed for a medium or high pressure boiler. The disoxidation mechanism of the process is represented by the following formula:

$$O_2 + N_2H_4 \rightarrow N_2 + 2H_2O \tag{I}$$

The other is a process employing sulfites, phosphites, ascorbic acid or tannin as a disoxidant which is mainly applied to a feed water employed for a low pressure boiler. The disoxidation mechanisms with sulfites, phosphites and ascorbic acid are respectively represented by the following formulae:

$$O_2 + 2Na_2SO_3 \rightarrow 2Na_2SO_4 \tag{II}$$

$$O_2 + 2Na_2HPO_3 \rightarrow 2Na_2HPO_4 \tag{III}$$

$$O_2 + 2C_6H_8O_6 \rightarrow 2C_6H_6O_6 + 2H_2O \tag{IV}$$

The disoxidation mechanism with tannin is estimated to consist in that tannin is hydrolyzed into glucose and gallic acid, and the resulting gallic acid reacts with oxygen.

In the conventional processes, however, serious disadvantages must be born up to achieve the disoxidation. That is to say, in the former process, an excess amount of hydrazine, for instance, 1.2 to 2 times the theoretical amount must be employed to remove oxygen completely so that the excess hydrazine migrates into a steam. When the steam containing hydrazine is employed for directly heating foods and drinks or for pasteurizing medical instruments, the hydrazine contacts human bodies. The process employing hydrazine is undesirable from the aspect of safety. The latter process has disadvantages such as the poor economy owing to the large amount of the disoxidant employed and the accumulation of a large amount of scale in a boiler owing to the employment of a large amount of the disoxidant. In the case of employing sodium sulfite as a disoxidant, the calculated amount of sodium sulfite required for removing 10 ppm of a dissolved oxygen is 80 ppm. Usually 120 ppm of sodium sulfite which is 50% by weight in excess of the calculated amount is employed. As a result, the corrosive sulfurous acid gas resulting from the thermal decomposition of the unchanged sodium sulfite migrates into a steam and the sodium sulfate as the reaction product of sodium sulfite and oxygen is accumulated in a boiler in an amount of 135 ppm per the amount of a boiler feed water.

OBJECTS OF THE INVENTION

An object of the present invention is to provide a process for disoxidating gases in which the oxygen in a gas is removed in a high efficiency at a low cost.

The other object of the invention is to provide a process for disoxidating gases suitable as a continuous disoxidation process in which disadvantages such as the accumulation of nonvolatile materials and the limitation in the capacity of absorbing oxygen are settled.

Another object of the invention is to provide a process for disoxidating water in which the dissolved oxygen in water is removed in a high efficiency at a low cost.

Further object of the invention is to provide a process for disoxidating water in which the disoxidated water does not contain toxic or corrosive volatile materials.

Still further object of the invention is to provide a process for disoxidating water in which the disoxidated water does not almost contain nonvolatile materials which result in the scale in a boiler.

These and other objects of the invention will be apparent from the following description.

DETAILED DESCRIPTION OF THE INVENTION

The present invention provides a process for disoxidating a gas which comprises contacting a gas being inert to hydrazines with a solution containing in a solvent (A) at least one of hydrazines and (B) at least one of (i) quinones having a first half-wave potential of not more than −650 mV against a saturated calomel electrode at 25° C. in acetonitrile in the case of employing 0.1 N tetraethylammonium perchlorate as a supporting electrolyte, and (ii) hydroquinones being the reduced forms of the said quinones, and if desired, (C) an alkali agent.

The process of the present invention for disoxidating gases is characterized by removing the oxygen contained in a gas with at least one of hydrazines in the presence of at least one of the specified quinones and the hydroquinones in the reduced forms thereof as a catalyst.

According to the present invention, the oxygen contained in a gas is removed in a markedly high efficiency and no nonvolatile materials are accumulated since the materials formed in the course of the disoxidation reaction are nitrogen and water. The hydrazines employed in the present invention are available industrially and the amounts of the hydrazines employed are small since their molecular weights are small (for instance, hydrazine: 32) and the reaction of them and oxygen is equimolecular reaction. Therefore, the process of the present invention is practiced at a low cost and is extremely econmical. Furthermore, the process of the present invention can be run continuously semipermanently by continuously adding the hydrazines to the system or by evaporating water from the system by heating if necessary.

The gases to which the disoxidation process of the present invention is applied are not particularly limited if they are inert to the hydrazines. Examples of the gas include air, nitrogen, ammonia, hydrogen, methane, ethane, propane, n-butane, argon, helium, neon, krypton, xenon and freons. Oxidative gases including halogens which themselves have an oxidative property in the absence of oxygen and acidic gases such as hydrochloric acid gas, carbon dioxide and sulfurous acid gas are unsuitable.

Examples of the hydrazines employed in the present invention include hydrazine hydrate, anhydrous hydrazine, hydrazine sulfate, hydrazine hydrochloride and hydrazine phosphate. Hydrazine hydrate is preferably employed. Those hydrazines may be employed alone or in combination.

Examples of the quinones and the hydroquinones, which are the reduced forms of the quinones, employed as a catalyst in the present invention include 2,5-dimethyl-1,4-benzoquinone, 2,6-dimethyl-1,4-benzoquinone, 2-methyl-6-ethyl-1,4-benzoquinone, 2-methyl-5-isopropyl-1,4-benzoquinone, 2-methyl-6-isopropyl-1,4-benzoquinone, 2,5-di-tert-butyl-1,4-benzoquinone, 2,6-di-tert-butyl-1,4-benzoquinone, 2,5-di-tert-amyl-1,4-benzoquinone, 2,6-di-tert-amyl-1,4-benzoquinone, trimethyl-1,4-benzoquinone, tetramethyl-1,4-benzoquinone, 2-methyl-1,4-naphthoquinone, 2,3-dimethyl-1,4-naphthoquinone, 2-amino-1,4-naphthoquinone, 2-chloro-1,4-naphthoquinone, 2,3-dichloro-1,4-naphthoquinone, 2-bromo-1,4-naphthoquinone, 2,3-dibromo-1,4-naphthoquinone, 2-amino-3-chloro-1,4-naphthoquinone, 2,7-dimethyl-1,4-naphthoquinone, 6-methyl-1,4-naphthoquinone, and the hydroquinones corresponding to the foregoing quinones. Those quinones and hydroquinones may be employed alone or in combination.

The quinones employed in the present invention have a first half-wave potential of not more than $-650$ mV against a saturated calomel electrode at 25° C. in acetonitrile in the case of employing 0.1 N tetraethylammonium perchlorate as an indicating electrolyte. Quinones having a first half-wave potential of more than $-650$ mV, such as 1,4-benzoquinone ($-510$ mV) and 2-methyl-1,4-benzoquinone ($-580$ mV), and the corresponding hydroquinones are unsuitable due to their insufficient catalytic activity in the reaction between hydrazine and oxygen.

The representative examples of the quinones and their first half-wave potentials determined under the specified condition mentioned above are as follows:

| | |
|---|---|
| 2,5-dimethyl-1,4-benzoquinone | $-670$ mV |
| Trimethyl-1,4-benzoquinone | $-750$ mV |
| Tetramethyl-1,4-benzoquinone | $-840$ mV |
| 2-methyl-1,4-naphthoquinone | $-780$ mV |
| 2-amino-1,4-naphthoquinone | $-920$ mV |

In the present invention, an alkali agent may be employed in addition to the hydrazines and the quinones or the corresponding hydroquinones. The alkali agent activates the hydrazines and further raises the catalytic activities of the quinones or the corresponding hydroquinones. Examples of the alkali agent employed include sodium hydroxide, potassium hydroxide, lithium hydroxide, sodium carbonate, potassium carbonate, sodium phosphate, potassium phosphate and ammonia. Those alkali agents may be employed alone or in combination.

Examples of the solvent employed in the present invention include water and lower alcohols having 1 to 5 carbon atoms. Those solvents may be employed alone or in combination.

The solution employed for disoxidating gases in the present invention which is hereinafter referred to as "treating solution" is prepared by dissolving (A) at least one of the hydrazines and (B) at least one of (i) the quinones and (ii) the corresponding hydroquinones, and if desired, (C) the alkali agent in the solvent. The component (B) is preferably employed in an amount of 0.01 to 100 parts by weight (hereinafter referred merely to as "parts") per 100 parts of the component (A) on the basis of hydrazine. The concentration of the component (A) in the treating solution is preferably 1 to 50% by weight (hereinafter referred merely to as "%") on the basis of hydrazine. The concentration of the component (B) in the treating solution is preferably 0.01 to 20%. The component (C) is preferably added in such a manner that the pH of the treating solution is not less than 10. The better results are obtained as the pH of the treating solution is higher.

According to the process of the present invention, the oxygen contained in a gas is removed by contacting the gas with the treating solution. Any method for contacting gas and liquid can be adopted, including a method in which a gas to be disoxidated is blown into the treating solution contained in a vessel through an inlet tube which is inserted close to the bottom of the vessel, and a method in which a gas to be disoxidated is blown into the treating solution contained in a column from the bottom thereof. As the treating temperature, a temperature of more than the freezing point of the treating solution to not more than the boiling point of the treating solution is employed. A temperature of about 20° C. to about 80° C. is preferably employed.

Furthermore, the present invention provides a process for disoxidating water which comprises the following steps of:

(I) disoxidating a gas containing oxygen which is inert to hydrazines and water by contacting the gas with a solution containing (A) at least one of hydrazines, (B) at least one of (i) quinones having a first half-wave potential of not more than −650 mV against a saturated calomel electrode at 25° C. in acetonitrile in the case of employing 0.1 N tetraethylammonium perchlorate as a supporting electrolyte, and (ii) hydroquinones being the reduced forms of the said quinones, and (C) an alkali agent, (II) contacting the disoxidated gas as it is or after purified with a water containing a dissolved oxygen to remove the large portion of the oxygen from the water, and (III) removing a slight amount of the oxygen remaining in the treated water by adding a nonvolatile disoxidant to the water, the amount of the disoxidant being corresponding to the amount of the residual oxygen.

The process of the present invention for disoxidating water is characterized by disoxidating water without contacting directly water with hydrazines. That is to say, first a gas such as nitrogen which is inert to hydrazines and water is disoxidated. Then the large portion of the dissolved oxygen contained in water is removed by employing the disoxidated gas. Further a slight amount of the oxygen remaining in the disoxidated water is removed by employing a slight amount of a disoxidant without the generation of any corrosive gases and the accumulation of any nonvolatile materials. The characteristics of the present invention will be explained in more detail.

The first characteristic is that in the step (I) an inert gas containing oxygen is disoxidated with a solution containing (A) at least one of hydrazines, (B) at least one of (i) quinones having a specified first half-wave potential and (ii) the corresponding hydroquinones, and (C) an alkali agent. The oxygen contained in an inert gas is not removed sufficiently only with the hydrazines. In the present invention, therefore, the specified quinones or hydroquinones, and the alkali agent are employed as catalysts in addition to the hydrazines.

The second characteristic is that water to be disoxidated is not contacted directly with hydrazines. According to the present invention, water to be disoxidated is contacted with a disoxidated gas to remove the large portion of the dissolved oxygen and a small amount of the dissolved oxygen remaining in the water is removed with a small amount of a disoxidant (at least one member selected from the group consisting of sulfurous acid and its salts, phosphorous acid and its salts, hypophosphorous acid and its salts, ascorbic acids and their salts, and tannins), the amount of which is corresponding to the amount of the residual oxygen. As a result, the lack of the safety caused by the direct contact of water with hydrazines in the conventional process is completely avoided, and the problems caused by the employment of a large amount of a disoxidant such as sulfite in the conventional process are also avoided completely since the amount of the disoxidant employed in the present invention is reduced to 1 to 2% of the amount usually employed in the conventional process.

The third characteristic is that the process of the present invention is economical. Although a large amount of an inert gas is employed, it can be recycled without any loss. Further the amount of the hydrazines required is very small since the amount corresponding to that of the oxygen contained in an inert gas is sufficient.

Furthermore, there are no troubles resulting from the change of volume caused by the disoxidation and the contamination with air since the same volume of nitrogen as that of the removed oxygen is formed in the disoxidation of an inert gas as shown in the reaction formula (I).

The step (I) of the process for disoxidating water is the same as the previously mentioned process for disoxidating gases except the following points: (1) The gases employed are those which are inert to water in addition to the hydrazines in a disoxidated state. Examples of the inert gases include disoxidated air, nitrogen, hydrogen, argon, helium, neon, krypton and xenon. Those gases may be employed alone or in combination. (2) It is essential to employ the alkali agent. (3) The solvent of the treating solution is preferably water. In the step (III), the oxygen remaining slightly in the water disoxidated in the step (II) is removed with a disoxidant. Examples of the disoxidant include sulfurous acid and its salts such as sodium, potassium and ammonium sulfites, and sodium, potassium and ammonium hydrogensulfites; phosphorous acid and its salts such as sodium, potassium and ammonium phosphites, and sodium, potassium and ammonium hydrogenphosphites; hypophosphorous acid and its salts such as sodium, potassium and ammonium salts; ascorbic acids such as L-ascorbic acid, D-araboascorbic acid and isoascorbic acid, and their salts such as sodium, potassium and ammonium salts; and tannins. The chemical structures of the tannins are different depending upon the woods employed as a starting material, but all tannins usually available are suitably employed. Representative examples of the tannins include gallotannin, quebracho tannin and chestnut tannin. The amount of the disoxidant employed is preferably 1 to 3 times equivalent of the dissolved oxygen remaining in the water disoxidated in the step (II). When the amount of the disoxidant is less than the above range, the residual dissolved oxygen is not removed sufficienty. When the amount of the disoxidant is more than the above range, the economy becomes poor and sulfurous acid is generated in the case of employing sulfurous acid or sulfites.

Conventional boiler compounds may be employed in the step (III). Examples of the boiler compounds include pH adjusting agents and sotlening agents such as sodium hydroxide, sodium carbonate, sodium phosphate, sodium hydrogenphosphate sodium dihydrogenphosphate, sodium hexametaphosphate, phosphoric acid and ammonia, and caustic embrittlement inhibitors such as tannins, lignins, starch and sodium nitrate. Those boiler compounds may be employed alone or in combination.

The treatments in the steps (I) to (III) are carried out at a temperature of more than the freezing point of the treating solution or the water to be disoxidated to not more than the boiling point of the treating solution or the water to be disoxidated.

The process of the present invention for disoxidating water is explained by the drawings.

Figure 1:
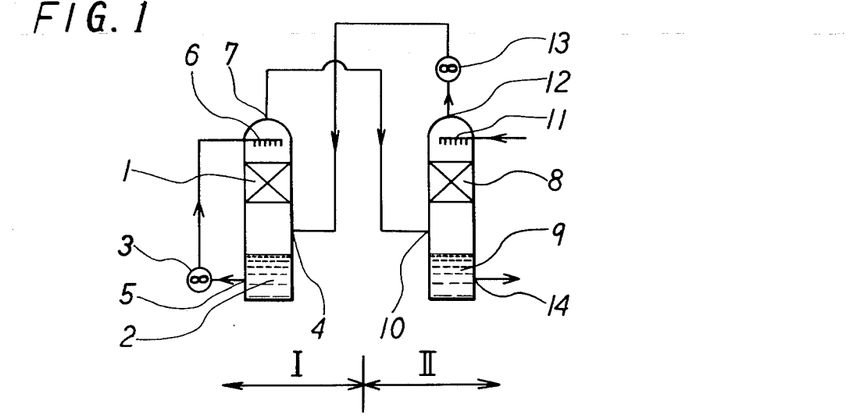
FIG. 1 is a schematic drawing of an embodiment of the apparatus employed in practicing the process of the present invention.

FIG. 1 is a schematic drawing showing an embodiment of the apparatus employed in practicing the steps (I) and (II) of the process of the present invention.

In FIG. 1, Zone I corresponds to the step (I) in which a gas which is inert to hydrazines and water is disoxidated by contacting it with the treating solution to give a gas free from oxygen and Zone II corresponds to the step (II) in which a water to be disoxidated is contacted with the disoxidated gas obtained in the step (I), whereby the oxygen dissolved in the water is moved into the gas to give a water nearly free from oxygen.

In Zone I, 1 is a gas treating device, at the lower part of which a tank 2 for containing the treating solution is provided. 3 is a circulating pump by which the treating solution in the tank 2 is sent to the upper part of the gas treating device 1. As the gas treating device 1, any gas-liquid contacting device can be employed so long as a gas to be disoxidated is sufficiently contacted with the treating solution. Examples of the gas treating device 1 include packed colums employing as a packing Raschig ring, Lessing ring, Berl saddle, Intalox saddle, tellerette packing or Paul ring, and bubble cap columns.

In Zone I, a gas to be disoxidated is introduced into the gas treating device 1 through a gas inlet 4 provided at the lower part of the gas treating device 1. The treating solution is sent to a treating solution inlet 6 provided at the upper part of the gas treating device 1 through a treating solution outlet 5 provided at the lower part of the tank 2 by means of the circulating pump 3 and is introduced into the gas treating device 1 through the treating solution inlet 6. The gas and the treating solution introduced into the gas treating device 1 are countercurrently contacted with each other, whereby the oxygen contained in the gas is reacted with hydrazine contained in the treating solution and converted to water to give a gas free from oxygen. The treated gas is exhausted from the gas treating device 1 through a gas outlet 7 provided at the upper part of the gas treating device 1.

In Zone II, 8 is a water treating device, at the lower part of which a tank 9 for containing a treated water is provided. As the water treating device 8, there are suitably employed the above-mentioned gas-liquid contacting devices such as packed columns and bubble cap columns.

In Zone II, the gas free from oxygen which is obtained in Zone I (hereinafter referred to as "treating gas") is introduced into the water treating device 8 through a gas inlet 10 provided at the lower part of the water treating device 8. A water to be disoxidated is introduced into the water treating device 8 through a water inlet 11 provided at the upper part of the water treating device 8. The treating gas and the water introduced into the water treating device 8 are countercurrently contacted with each other, whereby a mobile equilibrium depending upon the differences between the solubilities of the respective gases against water occurs at the interface between the water to be disoxidated and the treating gas so that a gas exchange on the basis of the dissolution of the treating gas into the water to be disoxidated and the liberation of the oxygen dissolved in the water occurs. As a result, the large portion of the dissolved oxygen in the water is removed. The treated water is stored in the tank 9. The stored water is sent to the successive step (III) through a water outlet 14. The treating gas in which oxygen is now contained as a result of the above-mentioned gas exchange is exhausted from the water treating device 8 through a gas outlet 12 provided at the upper part of the water treating device 8 and is sent as a gas to be disoxidated to the gas treating device 1 of Zone I by means of a blower or fan 13.

Figure 2:
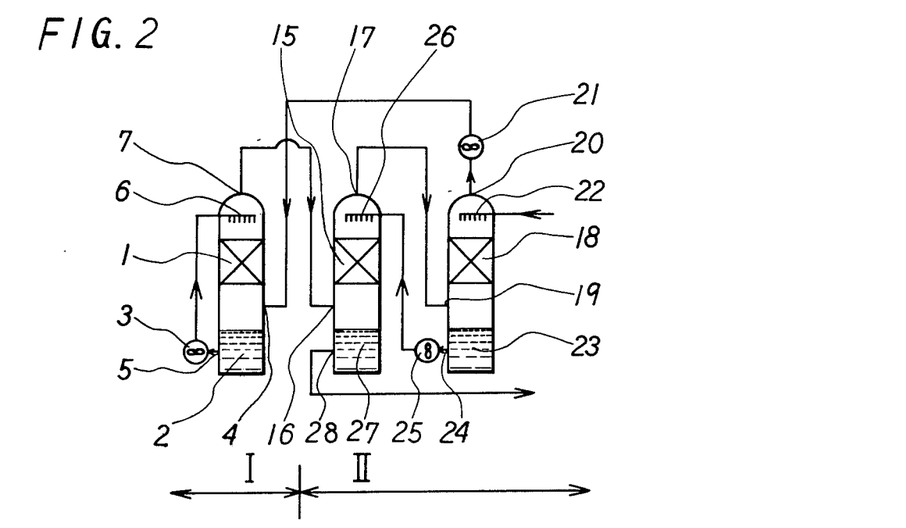
FIG. 2 is a schematic drawing of an another embodiment of the apparatus employed in practicing the process of the present invention.

FIG. 2 is a schematic drawing showing an another embodiment of the apparatus employed in practicing the steps (I) and (II) of the process of the present invention. In the apparatus shown in FIG. 2, two water treating devices are connected in series in order to utilize the treating gas efficiently.

The apparatus and the operations thereof in Zone I of FIG. 2 are the same as those in Zone I of FIG. 1.

In Zone II, the fresh treating gas free from oxygen which is obtained in Zone I is introduced into a second water treating device 15 through a gas inlet 16 provided at the lower part of the second water treating device 15. The treating gas is countercurrently contacted with a water to be disoxidated in the second water treating device 15. After the contaction, the treating gas is exhausted from the second water treating device 15 through a gas outlet 17 and introduced into a first water treating device 18 through a gas inlet 19 provided at the lower part of the first water treating device 18. The treating gas is again contacted countercurrently with a water to be disoxidated in the first treating device 18. After the second contaction, the treating gas is exhausted from the first water treating device 18 through a gas outlet 20 provided at the upper part of the first water treating device 18 and is sent to the gas treating device 1 of Zone I by means of a blower or fan 21. On the other hand, a water to be disoxidated is introduced into the first water treating device 18 through a water inlet 22 provided at the upper part of the first water treating device 18 and is countercurrently contacted with the treating gas in the first water treating device 18. After the contaction, the water is entered into a tank 23 for containing a treated water provided at the lower part of the first water treating device 18. The water in the tank 23 is exhausted through a water outlet 24 and sent to the second water treating device 15 by means of a circulating pump 25 through a water inlet 26 provided at the upper part of the second water treating device 15. In the second water treating device 15, the water is again countercurrently contacted with the fresh treating gas, whereby the large portion of the dissolved oxygen in the water is removed. The treated water is stored in a tank 27 for containing a treated water. The stored water is sent to the successive step (III) through a water outlet 28.

The apparatus employed in practicing the steps (I) to (II) of the process of the present invention for disoxidating water is not limited to those illustrated in the above, and any apparatus by which the treating solution and the treating gas, or the treating gas and water are sufficiently contacted mutually is suitably employed.

In the step (III) of the process of the present invention, a disoxidant such as sulfite is added to the water treated in the step (II) in order to remove a slight amount of the dissolved oxygen remaining therein. The method for adding the disoxidant is not particularly limited. For instance, there are exemplified a method of continuously or intermittently adding the disoxidant in an amount corresponding to that of the dissolved oxygen in water and a method of adding the required amount of the disoxidant to a boiler in advance.

The present invention is more particularly described and explained by means of the following illustrative Examples in which "%" is % by weight unless otherwise noted.

EXAMPLE 1

Into a glass vessel like a test tube which was 25 mm. in inner diameter and 30 cm. in height was added 90 ml. of a solution which contained hydrazine hydrate at a concentration of 30% (as hydrazine) and 2-methyl-1,4-naphthoquinone (the first half-wave potential: $-780$ mV) as a catalyst at a concentration of 1% in water and which was adjusted to pH 14 with sodium hydroxide. A of 1% in water and which was adjusted to pH 12 with a small amount of sodium hydroxide was employed as the treating solution, and a nitrogen gas containing 1.5% by volume of oxygen was treated with the solution. The result is shown in Table 3.

EXAMPLE 8

The same procedures as in Example 7 except that trimethyl-1,4-hydroquinone (the first half-wave potential of its oxidized form, trimethyl-1,4-benzoquinone: −750 mV) was employed instead of 2,5-dimethyl-1,4-hydroquinone were repeated. The result is shown in Table 3.

COMPARATIVE EXAMPLE 5

The same procedures as in Example 7 except that 1,4-benzoquinone was employed instead of 2,5-dimethyl-1,4-hydroquinone were repeated. The result is shown in Table 3.

COMPARATIVE EXAMPLE 6

The same procedures as in Example 7 except that 2,3-dichloro-5,6-dicyano-1,4-benzoquinone (the first half-wave potential: −510 mV) was employed instead of 2,5-dimethyl-1,4-hydroquinone were repeated. The result is shown in Table 3.

Table 3

| | Catalyst | | Oxygen conc. before treatment | Oxygen conc. after treatment |
|---|---|---|---|---|
| | Kind | Conc. (%) | (% by volume) | (% by volume) |
| Ex. 7 | 2,5-dimethyl-1,4-hydroquinone | 1.0 | 1.5 | 0.17 |
| Ex. 8 | Trimethyl-1,4-hydroquinone | 1.0 | 1.5 | <0.01 |
| Com. Ex. 5 | 1,4-benzoquinone | 1.0 | 1.5 | 1.1 |
| Com. Ex. 6 | 2,3-dichloro-5,6-dicyano-1,4-benzoquinone | 1.0 | 1.5 | 1.4 |

As shown in Table 3, the catalysts falling within the scope of the present invention exhibited marked effects.

EXAMPLE 9

The same procedures as in Example 1 were repeated except that 90 ml. of a solution which contained hydrazine hydrate at a concentration of 10% (as hydrazine) and 2,6-dimethyl-1,4-benzoquinone (the first half-wave potential: −660 mV) at a concentration of 1% in water and which was adjusted to pH 14 with sodium hydroxide was employed as the treating solution, and an ammonia gas containing 2% by volume of oxygen was treated with the solution. The oxygen concentration in the ammonia gas was reduced to 0.2% by volume.

EXAMPLE 10

The same procedures as in Example 9 except that 2-methyl-1,4-naphthoquinone was employed instead of 2,6-dimethyl-1,4-benzoquinone, potassium hydroxide was employed instead of sodium hydroxide, and a propane gas containing 2% by volume of oxygen was employed instead of the ammonia gas were repeated. The oxygen concentration in the propane gas was reduced under 0.01% by volume.

EXAMPLE 11

Into a glass vessel which was 70 mm. in inner diameter and 40 cm. in height was added 1000 ml. of a solution which contained hydrazine hydrate at a concentration of 10% (as hydrazine) and 2-methyl-1,4-naphthoquinone at a concentration of 1% in water and which was adjusted to pH 14 with sodium hydroxide. A capillary tube was inserted into the glass vessel in such a manner that the one end thereof was at a height of 1 cm. from the bottom of the vessel. An air containing 21% by volume of oxygen was passed in the solution kept at 70° to 80° C. at 25 ml./min. through the capillary tube for 14 days (8 hours/day). When the hydrazine concentration in the treating solution was reduced under 5% by the reaction between hydrazine and oxygen, and the volume of the treating solution was reduced under 800 ml. owing to evaporation, 80% hydrazine hydrate and water were respectively added to the glass vessel in such a manner that the concentration of hydrazine was kept 10% and the volume of the treating solution was kept 1000 ml. The oxygen concentration in the treated gas was determined at regular intervals from 30 minutes to 8 hours after the beginning of the treatment every day for 14 days. The oxygen concentration was always under 0.01% by volume.

EXAMPLE 12

The steps (I) and (II) of the process of the present invention for disoxidating water were carried out employing the apparatus shown in FIG. 1. A column 200 mm. in inner diameter and 4 m. in height in which tellerette packings having a dimension of 1 inch were packed up to a height of 3.8 m. was employed as the water treating device 8 and the gas treating device 1. A 200 liter tank was employed as the tank 9 for containing the treated water and the tank 2 for containing the treating solution. As the treating solution, there was employed 100 liters of a solution which contained hydrazine hydrate at a concentration of 13% (as hydrazine) and 2-methyl-1,4-naphthoquinone as a catalyst at a concentration of 1% in water and which was adjusted to pH 14 by adding sodium hydroxide in such a manner that its concentration became about 4%.

An air was introduced into the gas treating device 1 at a flow rate of 2 m$^3$./hr. and countercurrently contacted therein with the treating solution which was introduced at a flow rate of 1 m$^3$./hr., whereby the oxygen in the air was removed to give an inert gas free from oxygen. The obtained inert gas was circulated successively from the gas treating device 1 to the water treating device 8 and from the water treating device 8 to the gas treating device 1, as shown in FIG. 1. On the other hand, a demineralized water containing 11 ppm of a dissolved oxygen at 10° C. was introduced at 2 m$^3$./hr. into the water treating device 8 through the water inlet 11 and countercurrently contacted therein with the inert gas. A series of the treatments of the steps (I) to (II) mentioned above were carried out at 10° C. The treatments were continued under the above-mentioned condition and the concentration of the dissolved oxygen in the treated water was determined by the same oxygen analizer as employed in Example 1 after 3 hours from the beginning of the treatments when the treatments were reached to stable conditions. The concentration of the dissolved oxygen was reduced to 0.1 ppm. The concentration of the hydrazine remaining in the treated water was also determined by an analysis capillary tube was inserted into the glass vessel in such a manner that the one end thereof was at a height of 1 cm. from the bottom of the vessel. An air containing 21.0% by volume of oxygen was blown in the solution kept at 30° C. at 25 ml./min. through the capillary tube. The concentration of the oxygen contained in the treated air was determined by an oxygen analyzer (Fieldlab made by Toshiba Beckmann Kabushiki Kaisha). The result is shown in Table 1.

EXAMPLE 2

The same procedures as in Example 1 except that the concentration of 2-methyl-1,4-naphthoquinone was changed to 0.1% were repeated. The result is shown in Table 1.

EXAMPLE 3

The same procedures as in Example 1 except that trimethyl-1,4-benzoquinone (the first half-wave potential: −750 mV) was employed instead of 2-methyl-1,4-naphthoquinone were repeated. The result is shown in Table 1.

EXAMPLE 4

The same procedures as in Example 3 except that the concentration of trimethyl-1,4-benzoquinone was changed to 0.1% were repeated. The result is shown in Table 1.

COMPARATIVE EXAMPLE 1

The same procedures as in Example 1 except that 1,4-benzoquinone (the first half-wave potential: −510 mV) was employed instead of 2-methyl-1,4-naphthoquinone were repeated. The result is shown in Table 1.

COMPARATIVE EXAMPLE 2

The same procedures as in Example 1 except that 2-methyl-1,4-benzoquinone (the first half-wave potential: −580 mV) was employed instead of 2-methyl-1,4-naphthoquinone were repeated. The result is shown in Table 1.

COMPARATIVE EXAMPLE 3

The same procedures as in Example 1 except that 2-methyl-1,4-naphthoquinone was not employed were repeated. The result is shown in Table 1.

Table 1

| | Catalyst | | Oxygen conc. before treatment | Oxygen conc. after treatment |
|---|---|---|---|---|
| | Kind | Conc. (%) | (% by volume) | (% by volume) |
| Ex. 1 | 2-methyl-1,4-naphthoquinone | 1.0 | 21.0 | 0.75 |
| Ex. 2 | 2-methyl-1,4-naphthoquinone | 0.1 | 21.0 | 1.36 |
| Ex. 3 | Trimethyl-1,4-benzoquinone | 1.0 | 21.0 | 1.45 |
| Ex. 4 | Trimethyl-1,4-benzoquinone | 0.1 | 21.0 | 3.10 |
| Com. Ex. 1 | 1,4-benzoquinone | 1.0 | 21.0 | 20.0 |
| Com. Ex. 2 | 2-methyl-1,4-benzoquinone | 1.0 | 21.0 | 19.5 |
| Com. Ex. 3 | — | — | 21.0 | 21.0 |

As shown in Table 1, when the quinones having a first half-wave potential of more than −650 mV were employed as a catalyst (Comparative Examples 1 and 2) or no catalyst was employed (Comparative Example 3), the oxygen concentration in the air was not nearly reduced by the treatment (Comparative Example 1: 20.0% by volume, Comparative Example 2: 19.5% by volume, Comparative Example 3: 21.0% by volume). On the other hand, when the quinones having a first half-wave potential of not more than −650 mV were employed (Examples 1 to 4), the oxygen concentration in the air was markedly reduced under about 3% by volume and in the best case to 0.75% by volume.

EXAMPLE 5

The same procedures as in Example 1 were repeated except that 90 ml. of a solution which contained hydrazine hydrate at a concentration of 5% (as hydrazine) and 2-methyl-1,4-naphthohydroquinone (the first half-wave potential of its oxidized form, 2-methyl-1,4-naphthoquinone: −780 mV) as a catalyst at a concentration of 1% in a 85% ethanol and which was adjusted to pH 13 with a small amount of potassium hydroxide was employed as the treating solution. The result is shown in Table 2.

EXAMPLE 6

The same procedures as in Example 5 except that tetramethyl-1,4-benzoquinone (the first half-wave potential: −840 mV) was employed instead of 2-methyl-1,4-naphthohydroquinone were repeated. The result is shown in Table 2.

COMPARATIVE EXAMPLE 4

The same procedures as in Example 5 except that hydroquinone (the first half-wave potential of its oxidized form, 1,4-benzoquinone: −510 mV) was employed instead of 2-methyl-1,4-naphthohydroquinone were repeated. The result is shown in Table 2.

Table 2

| | Catalyst | | Oxygen conc. before treatment | Oxygen conc. after treatment |
|---|---|---|---|---|
| | Kind | Conc. (%) | (% by volume) | (% by volume) |
| Ex. 5 | 2-methyl-1,4-naphthohydroquinone | 1.0 | 21.0 | 0.14 |
| Ex. 6 | Tetramethyl-1,4-benzoquinone | 1.0 | 21.0 | <0.01 |
| Com. Ex. 4 | Hydroquinone | 1.0 | 21.0 | 19.5 |

As shown in Table 2, when hydroquinone was employed as a catalyst, the oxygen concentration in the air was reduced merely to 19.5% by volume. On the other hand, when 2-methyl-1,4-naphthohydroquinone and tetramethyl-1,4-benzoquinone which fall within the scope of the present invention were employed as a catalyst, the oxygen concentrations in the airs were reduced to 0.14% by volume and under 0.01% by volume, respectively.

EXAMPLE 7

The same procedures as in Example 1 were repeated except that 90 ml. of a solution which contained hydrazine sulfate at a concentration of 10% (as hydrazine) and 2,5-dimethyl-1,4-hydroquinone (the first half-wave potential of its oxidized form, 2,5-dimethyl-1,4-benzoquinone: −670 MV) as a catalyst at a concentration method employing p-aminobenzaldehyde provided in JIS B 8224 (test method for boiler feed water and boiler water).

The water treated in the step (II) was then sent to the step (III). In the step (III), the water was introduced into a 100 liter residence vessel equipped with a heating means at 10 liters/min. in such a manner that the water stayed therein for 10 minutes. The water in the vessel was kept at 25° C. At the entrance of the vessel, a solution of sodium sulfite in water was added to the water in such a manner that the amount of sodium sulfite was 2 times equivalent to the dissolved oxygen in the water. At the outlet of the vessel, the dissolved oxygen in the water was determined by the oxygen analizer. The concentration of the dissolved oxygen was reduced to 0.01 ppm by adding 1.6 ppm of sodium sulfite in the step (III).

The detailed results are shown in Table 4.

EXAMPLE 13

The same procedures as in Example 12 except that the concentration of 2-methyl-1,4-naphthoquinone was changed to 0.1% were repeated. The results are shown in Table 4.

EXAMPLE 14

The same procedures as in Example 12 except that trimethyl-1,4-benzoquinone was employed instead of 2-methyl-1,4-naphthoquinone were repeated. The results are shown in Table 4.

EXAMPLE 15

The same procedures as in Example 14 except that the concentration of trimethyl-1,4-benzoquinone was changed to 0.1% were repeated. The results are shown in Table 4.

COMPARATIVE EXAMPLE 7

The same procedures as in Example 12 except that 1,4-benzoquinone was employed instead of 2-methyl-1,4-naphthoquinone were repeated. The results are shown in Table 4.

COMPARATIVE EXAMPLE 8

The same procedures as in Example 12 except that 2-methyl-1,4-benzoquinone was employed instead of 2-methyl-1,4-naphthoquinone were repeated. The results are shown in Table 4.

COMPARATIVE EXAMPLE 9

The same procedures as in Example 12 except that 2-methyl-1,4-naphthoquinone was not employed were repeated. The results are shown in Table 4.

Table 4

| | Steps (I) to (II) | | | | Step (III) | |
|---|---|---|---|---|---|---|
| | Catalyst | | Oxygen conc. in treated water (ppm) | Hydrazine conc. in treated water (ppm) | Amount of sodium sulfite added to water (ppm) | Oxygen conc. in treated water (ppm) |
| | Kind | Conc. (%) | | | | |
| Ex. 12 | 2-methyl-1,4-naphthoquinone | 1.0 | 0.1 | Not detected. | 1.6 | <0.01 |
| Ex. 13 | 2-methyl-1,4-naphthoquinone | 0.1 | 0.2 | Not detected. | 3.2 | <0.01 |
| Ex. 14 | Trimethyl-1,4-benzoquinone | 1.0 | 0.2 | Not detected. | 3.2 | <0.01 |
| Ex. 15 | Trimethyl-1,4-benzoquinone | 0.1 | 0.4 | Not detected. | 6.4 | <0.01 |
| Com. Ex. 7 | 1,4-benzoquinone | 1.0 | 10.5 | Not detected. | 168 | <0.01 |
| Com. Ex. 8 | 2-methyl-1,4-benzoquinone | 1.0 | 10.2 | Not detected. | 163 | <0.01 |
| Com. Ex. 9 | — | — | 11.0 | Not detected. | 176 | <0.01 |

Table 4 shows the followings: When 1,4-benzoquinone (Comparative Example 7), 2-methyl-1,4-benzoquinone (Comparative Example 8) or nothing (Comparative Example 9) was employed as a catalyst, the oxygen concentration in the water treated in the step (II) was not nearly reduced (Comparative Example 7: 10.5 ppm, Comparative Example 8: 10.2 ppm, Comparative Example 9: 11.0 ppm). Therefore, a large amount of sodium sulfite was required in the step (III) (Comparative Example 7: 168 ppm, Comparative Example 8: 163 ppm, Comparative Example 9: 176 ppm). On the other hand, when 2-methyl-1,4-naphthoquinone (Examples 12 to 13) or trimethyl-1,4-benzoquinone (Examples 14 to 15) was employed as a catalyst, the oxygen concentration in the water treated in the step (II) was markedly reduced (to not more than 0.4 ppm and in the best case to 0.1 ppm). Therefore, only a small amount of sodium sulfite was required in the step (III) (not more than 6.4 ppm and in the best case 1.6 ppm). As a result, the amount of the salt accumulated in the treated water in Examples 12 to 15 was not more than 1/30 time and in the best case 1/100 time that in Comparative Examples 7 to 9.

EXAMPLE 16

The same procedures as in Example 12 were repeated except that 100 liters of an aqueous solution which contained hydrazine hydrate at a concentration of 38% (as hydrazine), tetramethyl-1,4-hydroquinone (the first half-wave potential of its oxidized form, tetramethyl-1,4-benzoquinone: −840 mV) as a catalyst at a concentration of 0.5% and potassium hydroxide at a concentration of 30% was employed as the treating solution, and the temperature of the step (I) was changed to 60° C. The results are shown in Table 5.

EXAMPLE 17

The same procedures as in Example 16 except that the concentration of potassium hydroxide was changed to 5% were repeated. The results are shown in Table 5.

EXAMPLE 18

The same procedures as in Example 16 except that 2,3-dichloro-1,4-naphthohydroquinone (the first half-wave potential of its oxidized form, 2,3-dichloro-1,4-naphthoquinone: −650 mV) was employed instead of tetramethyl-1,4-hydroquinone were repeated. The results are shown in Table 5.

EXAMPLE 19

The same procedures as in Example 18 except that the concentration of potassium hydroxide was changed to 5% were repeated. The results are shown in Table 5.

COMPARATIVE EXAMPLE 10

The same procedures as in Example 16 except that hydroquinone was employed instead of tetramethyl-1,4-hydroquinone were repeated. The results are shown in Table 5.

Table 5

|  | Catalyst | | Conc. of KOH (%) | Oxygen conc. in treated water (ppm) | Hydrazine conc. in treated water (ppm) | Amount of sodium sulfite added to water (ppm) | Oxygen conc. in treated water (ppm) |
| --- | --- | --- | --- | --- | --- | --- | --- |
|  | Kind | Conc. (%) | | | | | |
| Ex. 16 | Tetramethyl-1,4-hydroquinone | 0.5 | 30 | 0.1 | Not detected. | 1.6 | <0.01 |
| Ex. 17 | Tetramethyl-1,4-hydroquinone | 0.5 | 5 | 0.3 | Not detected. | 4.8 | <0.01 |
| Ex. 18 | 2,3-dichloro-1,4-naphthohydroquinone | 0.5 | 30 | 0.2 | Not detected. | 3.2 | <0.01 |
| Ex. 19 | 2,3-dichloro-1,4-napthohydroquinone | 0.5 | 5 | 0.5 | Not detected. | 8.0 | <0.01 |
| Com. Ex. 10 | Hydroquinone | 0.5 | 30 | 10.7 | Not detected. | 171 | <0.01 |

Table 5 shows the followings: When hydroquinone was employed as a catalyst (Comparative Example 10), the oxygen concentration in the water treated in the step (II) was not nearly reduced (10.7 ppm). Therefore, a large amount of sodium sulfite, i.e., 171 ppm was required in the step (III). On the other hand, when tetramethyl-1,4-hydroquinone (Examples 16 to 17) or 2,3-dichloro-1,4-naphthohydroquinone (Examples 18 to 19) was employed as a catalyst, the oxygen concentration in the water treated in the step (II) was reduced to not more than 0.5 ppm. Therefore, the amount of sodium sulfite required in the step (III) was only not more than 8.0 ppm.

EXAMPLE 20

With respect to the steps (I) to (II), the same apparatus as in Example 12 except that a bubble cap column having three bubble trays was employed as the gas treating device 1 and the water treating device 8 instead of the packed column was employed. As the treating solution, there was employed 100 liters of an aqueous solution which contained hydrazine sulfate at a concentration of 1.2% (as hydrazine) and 2,5-dimethyl-1,4-benzoquinone as a catalyst at a concentration of 1% and which was adjusted to pH 13 with sodium hydroxide. A helium gas employed as the treating gas was circulated at a flow rate of 2 m.³/hr. successively from the gas treating device 1 to the water treating device 8 and from the water treating device 8 to the gas treating device 1, as shown in FIG. 1. The treating solution was circulated at a flow rate of 1 m.³/hr. successively from the tank 2 for containing the treating solution to the gas treating device 1 and from the gas treating device 1 to the tank 2. An industrial water (dissolved oxygen: 11 ppm at 10° C., pH: 7.2, total hardness: 32 ppm, alkali: 28 ppm, chlorine ion: 11 ppm, sulfate ion: 14 ppm) was introduced into the water treating device 8 at a flow rate 1 m.³/hr. All treatments were carried out at 10° C. The concentration of the dissolved oxygen in the water treated under such conditions was determined by the oxygen analyzer after 3 hours from the beginning of the treatments when the treatments were reached to stable conditions. The concentration of the dissolved oxygen was reduced to 0.2 ppm. Hydrazine was not detected in the treated water.

The water treated in the step (II) was then sent to the step (III). The step (III) was carried out in the same manner as in Example 12 except that L-ascorbic acid was employed as a disoxidant, sodium hydroxide and sodium hydrogenphosphate as a boiler compound were added to the residence vessel in such a manner that their concentrations became 3 ppm and 30 ppm, respectively, and the water in the residence vessel was kept at 60° C. The concentration of the dissolved oxygen was reduced to 0.01 ppm by adding 1.1 ppm of L-ascorbic acid in the step (III).

EXAMPLE 21

The steps (I) and (II) were carried out employing the apparatus shown in FIG. 2. The same packed column as in Example 12 was employed as the gas treating device 1 and the water treating devices 15 and 18.

A nitrogen gas employed as the treating gas was circulated at a flow rate of 2 m.³/hr. successively from the gas treating device 1 to the second water treating device 15, from the second water treating device 15 to the first water treating device 18 and from the first water treating device 18 to the gas treating device 1, as shown in FIG. 2. As the treating solution, there was employed 150 liters of an aqueous solution which contained hydrazine hydrate at a concentration of 19% (as hydrazine) and 2-methyl-1,4-naphthohydroquinone (the first half-wave potential of its oxidized form, 2-methyl-1,4-naphthoquinone: −780 mV) as a catalyst at a concentration of 2% and which was adjusted to pH 14 by adding sodium hydroxide in such a manner that its concentration became about 4%. The treating solution was countercurrently contacted with the nitrogen gas at a flow rate of 2 m.³/hr. in the gas treating device 1. A demineralized water containing 11 ppm of a dissolved oxygen at 10° C. was passed at a flow rate of 3 m.³/hr. in the first water treating device 18 and the second water treating device 15 in order and countercurrently contacted therein with the disoxidated nitrogen gas. All treatments in the steps (I) to (II) were carried out at 10° C. The concentration of the dissolved oxygen in the water treated under such conditions was determined by the oxygen analizer after 3 hours from the beginning of the treatments when the treatments were reached to stable conditions. The concentration of the dissolved oxygen was reduced to 0.03 ppm. Hydrazine was not detected in the treated water.

The water treated in the step (II) was then sent to the step (III). The step (III) was carried out in the same manner as in Example 12 except that the water treated in the step (II) was introduced into the residence vessel at a flow rate of 5 liters/min. in such a manner that the water stayed therein for 20 minutes, the water in the residence vessel was kept at 80° C., gallotannin and sodium phosphite were employed as a disoxidant, and sodium hydroxide was added as a pH adjuster in such a manner that the water in the residence vessel was adjusted to pH 10. The concentration of the dissolved oxygen was reduced to not more than 0.01 ppm by adding 1 ppm of gallotannin and 0.5 ppm of sodium phosphite.

What we claim is:

1. A process for disoxidating a gas which comprises contacting a gas being inert to hydrazines with a solution consisting essentially of a solvent, wherein said solvent is at least one member selected from the group consisting of water and lower alcohols having 1 to 5 carbon atoms, (A) at least one hydrazine selected from the group consisting of hydrazine hydrate, anhydrous hydrazine, hydrazine sulfate, hydrazine hydrochloride, and hydrazine phosphate, (B) 0.01 to 100 parts by weight of at least one (i) quinones having a first half-wave potential of not more than −650 mV against a saturated calomel electrode at 25° C. in acetonitrile in the case of employing 0.1 N tetraethylammonium perchlorate as a supporting electrolyte, and (ii) hydroquinones being the reduced forms of the said quinones, per hundred parts by weight of component (A), and (C) an alkali agent; wherein said alkali agent is at least one member selected from the group consisting of sodium hydroxide, potassium hydroxide, lithium hydroxide, sodium carbonate, potassium carbonate, sodium phosphate, potassium phosphate, and ammonia, components (A), (B) and (C) being present in amounts effective for disoxidating the gas.

2. The process of claim 1, wherein the component (B) is selected from the group consisting of 2,5-dimethyl-1,4-benzoquinone, 2,6-dimethyl-1,4-benzoquinone, 2-methy-6-ethyl-1,4-benzoquinone, 2-methyl-5-isopropyl-1,4-benzoquinone, 2-methyl-6-isopropyl-1,4-benzoquinone, 2,5-di-tert-butyl-1,4-benzoquinone, 2,6-di-tert-butyl-1,4-benzoquinone, 2,5-di-tert-amyl-1,4-benzoquinone, 2,6-di-tert-amyl-1,4-benzoquinone, trimethyl-1,4-benzoquinone, tetramethyl-1,4-benzoquinone, 2-methyl-1,4-naphthoquinone, 2,3-dimethyl-1,4-naphthoquinone, 2-amino-1,4-naphthoquinone, 2-chloro-1,4-naphthoquinone, 2,3-dichloro-1,4-naphthoquinone, 2-bromo-1,4-naphthoquinone, 2,3-dibromo-1,4-naphthoquinone, 2-amino-3-chloro-1,4-naphthoquinone, 2,7-dimethyl-1,4-naphthoquinone, 6-methyl-1,4-naphthoquinone, and the hydroquinones corresponding to the foregoing quinones.

3. The process of claim 1, wherein the component (B) is selected from the group consisting of 2,5-dimethyl-1,4-benzoquinone, 2,6-dimethyl-1,4-benzoquinone, 2-methyl-6-ethyl-1,4-benzoquinone, 2-methyl-5-isopropyl-1,4-benzoquinone, 2-methyl-6-isopropyl-1,4-benzoquinone, 2,5-di-tert-butyl-1,4-benzoquinone, 2,6-di-tert-butyl-1,4-benzoquinone, 2,5-di-tert-amyl-1,4-benzoquinone, 2,6-di-tert-amyl-1,4-benzoquinone, trimethyl-1,4-benzoquinone, tetramethyl-1,4-benzoquinone, 2-methyl-1,4-naphthoquinone, 2,3-dimethyl-1,4-naphthoquinone and the hydroquinones corresponding to the foregoing quinones.

4. The process of claim 1, wherein the concentration of the component (A) in the solution is 1 to 50% by weight on the basis of hydrazine.

5. The process of claim 1, wherein the concentration of the component (B) in the solution is 0.01 to 20% by weight.

6. The process of claim 1, wherein the pH of the solution is not less than 10.

7. The process of claim 1, wherein the gas is selected from the group consisting of air, nitrogen, ammonia, hydrogen, methane, ethane, propane, n-butane, argon, helium, neon, krypton, xenon and freons.

8. A process for disoxidating water which comprises the following steps of:

(I) disoxidating a gas containing oxygen which is inert to hydrazines and water by contacting the gas with a solution consisting essentially of a solvent, wherein said solvent is at least one member selected from the group consisting of water and lower alcohols having 1 to 5 carbon atoms, (A) at least one hydrazine selected from the group consisting of hydrazine hydrate, anhydrous hydrazine, hydrazine sulfate, hydrazine hydrochloride, and hydrazine phosphate, (B) 0.01 to 100 parts by weight of at least one of (i) quinones having a first half-wave potential of not more than −650 mV against a saturated calomel electrode at 25° C. in acetonitrile employing 0.1 N tetraethylammonium perchlorate as a supporting electrolyte, and (ii) hydroquinones being the reduced forms of the said quinones per 100 parts by weight of component (A), and (C) an alkali agent, wherein said alkali agent is at least one member selected from the group consisting of sodium hydroxide, potassium hydroxide, lithium hydroxide, sodium carbonate, potassium carbonate, sodium phosphate, potassium phosphate, and ammonia, (II) contacting the disoxidated gas with water containing dissolved oxygen to remove a major portion of the oxygen from the water, and (III) removing the oxygen remaining in the treated water by adding a nonvolatile disoxidant to the water, the amount of the disoxidant being effective for removing the residual oxygen.

9. The process of claim 8, wherein the component (B) is selected from the group consisting of 2,5-dimethyl-1,4-benzoquinone, 2,6-dimethyl-1,4-benzoquinone, 2-methyl-6-ethyl-1,4-benzoquinone, 2-methyl-5-isopropyl-1,4-benzoquinone, 2-methyl-6-isopropyl-1,4-benzoquinone, 2,5-di-tert-butyl-1,4-benzoquinone, 2,6-di-tert-butyl-1,4-benzoquinone, 2,5-di-tertamyl-1,4-benzoquinone, 2,6di-tert-amyl-1,4-benzoquinone, trimethyl-1,4-benzoquinone, tetramethyl-1,4-benzoquinone, 2-methyl-1,4-naphthoquinone, 2,3-dimethyl-1,4-naphthoquinone, 2-amino-1,4-naphthoquinone, 2-chloro-1,4-naphthoquinone, 2,3-dichloro-1,4-naphthoquinone, 2-bromo-1,4-naphthoquinone, 2,3-dibromo-1,4-naphthoquinone, 2-amino-3-chloro-1,4-naphthoquinone, 2,7-dimethyl-1,4-naphthoquinone, 6-methyl-1,4-naphthoquinone, and the hydroquinones corresponding to the foregoing quinones.

10. The process of claim 8, wherein the component (B) is selected from the group consisting of 2,5-dimethyl-1,4-benzoquinone, 2,6-dimethyl-1,4-benzoquinone, 2-methyl-6-ethyl-1,4-benzoquinone, 2-methyl-6-isopropyl-1,4-benzoquinone, 2,5-di-tert-butyl-1,4-benzoquinone, 2,6-di-tert-butyl-1,4-benzoquinone, trimethyl-1,4-benzoquinone, tetramethyl-1,4-benzoquinone, 2-methyl-1,4-naphthoquinone, 2,3dimethyl-1,4-naphthoquinone, 2-amino-1,4-naphthoquinone, 2-chloro-1,4-naphthoquinone, 2,3-dichloro-1,4-naphthoquinone, 2-bromo-1,4-naphthoquinone, 2,3-dibromo-1,4naphthoquinone, 2-amino-3-chloro-1,4-naphthoquinone, 2,7-dimethyl-1,4-naphthoquinone, 6-methyl-1,4-naphthoquinone, and the hydroquinones corresponding to the foregoing quinones.

11. The process of claim 8, wherein the concentration of the component (A) in the solution is 1 to 50% by weight on the basis of hydrazine.

12. The process of claim 8, wherein the concentration of the component (B) in the solution is 0.01 to 20% by weight.

13. The process of claim 8, wherein the solvent is water.

14. The process of claim 8, wherein the pH of the solution is not less than 10.

15. The process of claim 8, wherein the gas is at least one member selected from the group consisting of disoxidated air, nitrogen, hydrogen, argon, helium, neon, krypton and xenon.

16. The process of claim 8, wherein the disoxidant is at least one member selected from the group consisting of sulfurous acid and its salts, phosphorous acid and its salts, hypophosphorous acid and its salts, ascorbic acids and their salts, and tannins.

17. The process of claim 8, wherein the disoxidated gas is recycled between the step (I) and the step (II).

18. The process of claim 8 wherein the disoxidated gas from step (I) is purified before being contacted with water containing dissolved oxygen.

19. The process of claim 8 wherein the amount of disoxidant is 1 to 3 times equivalent of the oxygen remaining in the treated water.

* * * * *